Patented Nov. 7, 1933

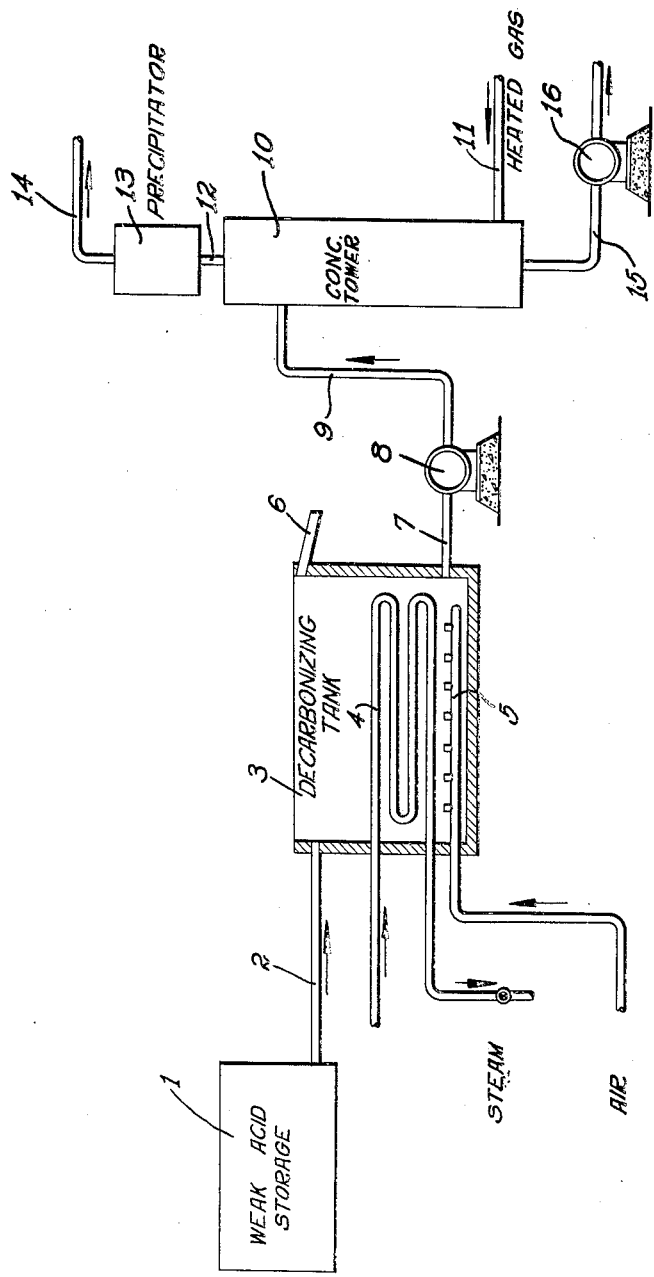

1,934,234

UNITED STATES PATENT OFFICE 1,934,234

PROCESS FOR PURIFYING AND CONCENTRATING ACID

Laurance V. Phillips, Port Arthur, Tex., assignor to The Texas Company, New York, N. Y., a corporation of Delaware Application April 10, 1931. Serial No. 529,071

7 Claims. (Cl. 23—173)

This invention relates to the manufacture of concentrated acid from weak acid recovered from the sludge formed in the treatment of hydrocarbon oils with acid to remove impurities.

My invention broadly contemplates manufacturing concentrated acid from the weak acid separated from the sludge formed in the acid treatment of hydrocarbon oils and containing carbonaceous material which decomposes and reacts with the acid during concentration by a process which comprises subjecting the weak acid to prolonged heating at a temperature below that at which decomposition of the carbonaceous material occurs so as to effect separation and removal of the carbonaceous material therefrom, and exposing the purified weak acid to relatively higher temperatures to produce a product of desired concentration with substantially no loss during such concentration due to chemical reduction by carbonaceous material.

My invention relates to the purification and recovery of acid used in the treatment of hydrocarbon oils and particularly the weak acid resulting from the treatment of naphtha, kerosene, lubricating fractions and the like with sulfuric acid to remove unsaturated materials and other impurities and thereby produce a refined oil. In the treatment of such oils with acid there is usually produced a sludge consisting of partially spent acid and the tarry or carbonaceous material removed from the oil. This sludge is subjected to cooking, usually in the presence of steam, and after mixing with a relatively lighter oil fraction or wash liquor which may accumulate during subsequent steps in the treatment of the sludge, in order to separate the weak or partially spent acid from the sludge. The remaining portion of the sludge consisting of heavy oil and tarry or pitchy matter may be disposed of as fuel or in any other desirable manner.

The separated weak acid contains a large amount of carbonaceous matter removed from the oil and which appears to be either in solution, dispersed in or emulsified with, the acid in extremely fine or colloidal form. This finely divided or dissolved material which cannot be removed from the acid by filtration or by ordinary settling means, readily decomposes when the acid is subjected to heating at the temperatures necessary to effect concentration of the acid, and forms products which react with, or chemically reduce, the acid, thereby resulting in the loss of substantial quantities of acid, largely as sulfur dioxide.

In the prior art methods of recovery, the separated acid has been immediately subjected to relatively high temperatures in order to remove its water content and concentrate it without first removing this carbonaceous material. It has been customary to subject the separated acid to temperatures at least in excess of the boiling temperature of water and more frequently at temperatures of around 350° F. or higher. At temperatures of around 250° F. or above the carbonaceous material is decomposed, as already mentioned, and may form free carbon a large portion of which reacts with the acid to chemically reduce a substantial portion thereof and convert it into sulfur dioxide which is evolved along with carbon dioxide resulting from the oxidation of the carbon by the acid. That portion of the carbonaceous material not entering into the reaction with the acid is precipitated within the concentrating apparatus, rapidly accumulating therein to form a substantial deposit of material which must be removed at frequent intervals to otherwise avoid interfering with the successful operation of the apparatus.

I have overcome these difficulties by my invention wherein the weak separated acid is subjected to prolonged heating prior to subsequent concentration at a temperature below that at which decomposition of the carbonaceous material occurs. During heating at a relatively low temperature this material is precipitated from the acid in a finely divided form and which may be coagulated by blowing the heated acid for a short time with air or other gas to facilitate its removal therefrom, following which the purified weak acid may then be subjected to concentration by heating at relatively higher temperatures.

Furthermore, I prefer to effect purification of the acid by prolonged heating at a temperature below which any appreciable concentration of the acid takes place and while maintaining the gravity of the acid at around 25° to 30° Bé., or at most not over 35.0° Bé., since when the concentration of the acid is increased above this point the solubility of the carbonaceous particles of sludge increases in the acid. Consequently the separation of this material from the acid is more readily effected by subjecting it to heating at conditions under which substantially no concentration of the acid occurs, and when maintaining it at a concentration at which the solubility of the sludge particles is a minimum.

In order that the invention will be better understood it will now be described in connection with the accompanying drawing which forms a part of this specification.

In the drawing, weak acid separated from the sludge formed during treatment of hydrocarbon oil with sulfuric acid is stored in a tank 1 from which it may be conducted thru a pipe 2 to a decarbonizing tank 3. The tank 3 is provided with a heating coil 4 thru which steam or any other suitable heating medium may be passed. A spray 5 is also provided in the bottom of the tank thru which air or other gas may be introduced for the purpose of blowing or agitating the contents of the tank.

The carbonaceous matter which separates from the acid in the tank 3 is lighter than the acid undergoing treatment and consequently rises to the top where it may be skimmed off and removed from the tank thru an outlet 6. The purified weak acid is withdrawn from the bottom of the tank 3 thru a pipe 7, by a pump 8, and delivered thru a pipe 9, preferably, to the upper portion of a concentrating tower 10.

The concentrating tower 10 may comprise a vertical vessel formed from a suitable acid resistant material or lined with a refractory material which is resistant to the action of concentrated acids, and packed with tile or brick, in the form of checkerwork, also formed from similar refractory material, and by which means the acid may be brought into intimate contact with a rising stream of hot gas as it flows or trickles downwardly over the packed material to accumulate in the bottom of the tower. The gas which may be heated to a temperature of around 1000° F. is introduced from a suitable furnace, not shown, thru an inlet connection 11 at the bottom of the tower thru which it rises and vaporizes the water content of the acid. The cooled gas, saturated with water vapor, collects in the top of the tower 10 and from which point it passes thru a conduit 12 leading to a Cottrell type precipitator 13 and by which means particles of acid entrained by the gases or vapors leaving the tower 10 may be precipitated therefrom to collect in the bottom of the precipitator and from there flow back into the top of the tower 10 as a reflux liquid. The gas or water vapor from which the acid particles have been precipitated leaves the top of the precipitator thru a pipe 14 from which it may be discharged to the atmosphere. The concentrated acid collecting in the bottom of the tower 10 may be drawn off thru a pipe 15, by a pump 16, and be delivered to a suitable storage tank, not shown.

In the practice of the invention the weak separated acid which may range from 25° to 30° Bé. and containing from 1 per cent to 1.5 per cent or higher of carbonaceous material is delivered from the tank 1 to the decarbonizing tank 3 wherein it may be heated to a temperature ranging from 160° to 200° F. and may be maintained at this temperature for a period of 15 hours or longer, although, depending upon the nature of the acid, a shorter period of heating, as for example from 5 to 6 hours, may be sufficient. After being subjected to prolonged heating in this manner the carbonaceous material is precipitated from the acid in a very fine form following which air may be introduced thru the spray 5 and the heated acid subjected to blowing for a period ranging from 1 to 2 hours in order to coagulate the fine particles of sludge or separated carbonaceous material which then rises thru the body of acid to the surface thereof and from which it may be readily skimmed off.

In this way 20 per cent or more of the carbonaceous material contained in the weak acid is removed and the purified acid of substantially the same gravity is drawn off from the decarbonizing tank 3 and conducted to the concentrating tower 10 wherein it is brought into intimate contact with hot flue gases and subjected to temperatures which may range from 350° to upwards of 1000° F. to produce a strong or concentrated acid of 60° to 66° Bé. It has been found by removing the above amount of carbonaceous material prior to concentration that an acid of from 60° to 66° Bé. gravity may be produced with substantially no loss of acid and that as a result of the removal of this carbonaceous material the yield may be increased by at least from 1 per cent to 1½ per cent over that otherwise obtained when concentrating recovered acid which has not been previously subjected to treatment to reduce the carbon content.

While the concentration of the purified acid by heating at substantially atmospheric pressures with hot flue gases has been described it is contemplated that other methods of concentrating the acid may be equally well employed as for example by heating under a vacuum and wherein the purified acid is conducted to a concentrating vessel maintained under subatmospheric pressures in which the weak acid may be subjected to relatively lower temperatures of around 250° F. to produce an acid having the desired degree of concentration.

Obviously many modifications and variations of the invention, as hereinbefore set forth, may be made without departing from the spirit and scope thereof, and therefore, only such limitations should be imposed as are indicated in the appended claims.

I claim:

1. In the preparation of concentrated acid from weak acid separated from sludge formed in the acid treatment of hydrocarbon oil and containing carbonaceous material which decomposes and reacts with the acid during concentration by heating, the process which comprises subjecting the weak acid to prolonged heating at a temperature insufficient to effect substantial vaporization and below that at which decomposition of the carbonaceous material occurs to effect precipitation of the carbonaceous material from the acid, removing the precipitated material, and exposing the purified acid to relatively higher temperatures to effect the desired degree of concentration with substantially no loss of acid due to chemical reduction by carbonaceous material.

2. In the preparation of concentrated acid from weak acid separated from sludge formed in the acid treatment of hydrocarbon oil and containing carbonaceous material which decomposes and reacts with the acid during concentration by heating, the process which comprises subjecting the weak acid to prolonged heating at a temperature insufficient to effect substantial vaporization and below that at which decomposition of the carbonaceous material occurs to effect precipitation of the carbonaceous material from the acid, blowing the heated acid with air to coagulate the precipitated material, removing the coagulated material, and exposing the purified acid to relatively higher temperatures to effect the desired degree of concentration with substantially no loss of acid due to chemical reduction by carbonaceous material.

3. In the preparation of concentrated acid from weak acid separated from sludge formed in the acid treatment of hydrocarbon oil and containing carbonaceous material which decomposes and reacts with the acid during concentration by heating, the process which comprises heating the weak acid to a temperature not in excess of 200° F., maintaining the acid at said temperature for a sufficient period of time to effect precipitation of the carbonaceous material from the acid, removing the precipitated carbonaceous material and exposing the purified acid to relatively higher temperatures to effect the desired degree of concentration with substantially no loss of acid due to chemical reduction by carbonaceous material.

4. In the preparation of concentrated acid from weak acid separated from sludge formed in the acid treatment of hydrocarbon oil and containing carbonaceous material which decomposes and reacts with the acid during concentration by heating, the process which comprises heating the weak acid to a temperature not in excess of 200° F., maintaining the acid at said temperature for a sufficient period of time to effect precipitation of the carbonaceous material from the acid, blowing the heated acid with air to coagulate the precipitated material, removing the coagulated material, and exposing the purified acid to relatively higher temperatures to effect the desired degree of concentration with substantially no loss of acid due to chemical reduction by carbonaceous material.

5. In the preparation of concentrated acid from weak acid separated from sludge formed in the acid treatment of hydrocarbon oil and containing carbonaceous material which decomposes and reacts with the acid during concentration by heating, the process of purifying the weak acid prior to concentration which comprises subjecting the weak acid to prolonged heating at a temperature insufficient to effect substantial vaporization and below that at which decomposition of the carbonaceous material occurs to effect precipitation of the carbonaceous material from the acid, and blowing the heated acid with air to coagulate the precipitated material and facilitate its removal therefrom.

6. In the preparation of concentrated acid from weak acid separated from sludge formed in the acid treatment of hydrocarbon oil and containing carbonaceous material which decomposes and reacts with the acid during concentration by heating, the process of purifying the weak acid prior to concentration which comprises heating the acid to a temperature of from about 160° F. to 200° F., maintaining the acid at said temperature for a sufficient period of time to effect precipitation of the carbonaceous material from the acid, and blowing the heated acid with air to coagulate the precipitated material and facilitate its removal therefrom.

7. The method of purifying and concentrating acid from the acid sludge produced by treatment of hydrocarbon oils with sulphuric acid which comprises delivering a weak acid of 25° Baumé to 30° Baumé resulting from extracting the acid from said acid sludge by water and containing from 1% to 1½% carbonaceous material to a decarbonizing zone, heating the weak acid in said decarbonizing zone to a temperature at which substantial precipitation of the carbonaceous material occurs but at a temperature insufficient to effect substantial vaporization and to cause material reduction of the acid to sulphur dioxide by the carbonaceous material, maintaining the weak acid in said zone without substantial decrease in temperature for a period of from about six to upwards of fifteen hours to effect precipitation of carbonaceous material, then passing air into the acid to pass upwards through the mixture in intimate contact therewith and to concentrate the precipitated carbonaceous material on the surface thereof, separating the precipitated carbonaceous material from the surface of the acid solution, draining the purified weak acid to a concentrating zone and concentrating said purified weak acid to a concentration of at least 60° Baumé.

LAURANCE V. PHILLIPS.